Oct. 31, 1961     R. H. WISE     3,006,375
VALVE
Filed Oct. 3, 1957
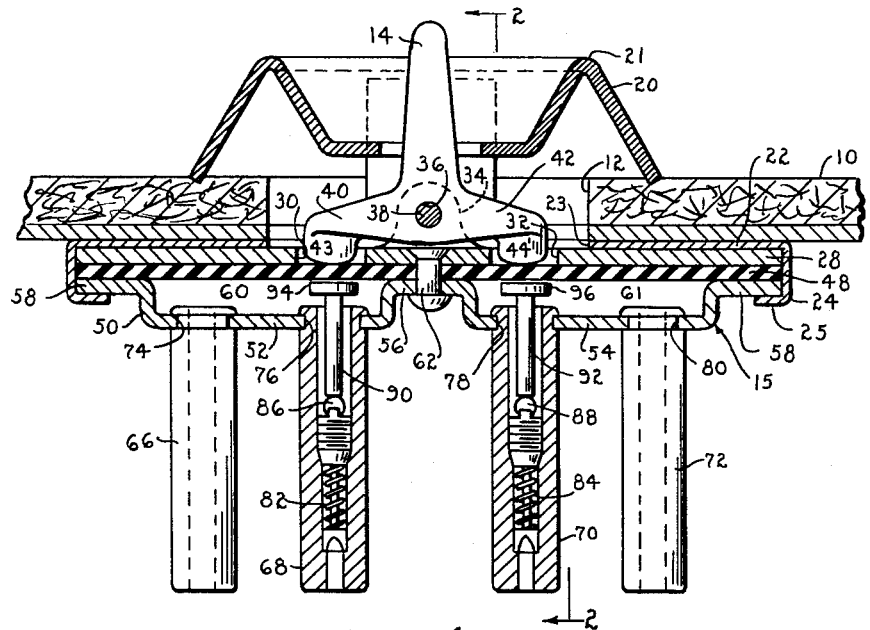
Fig.-1
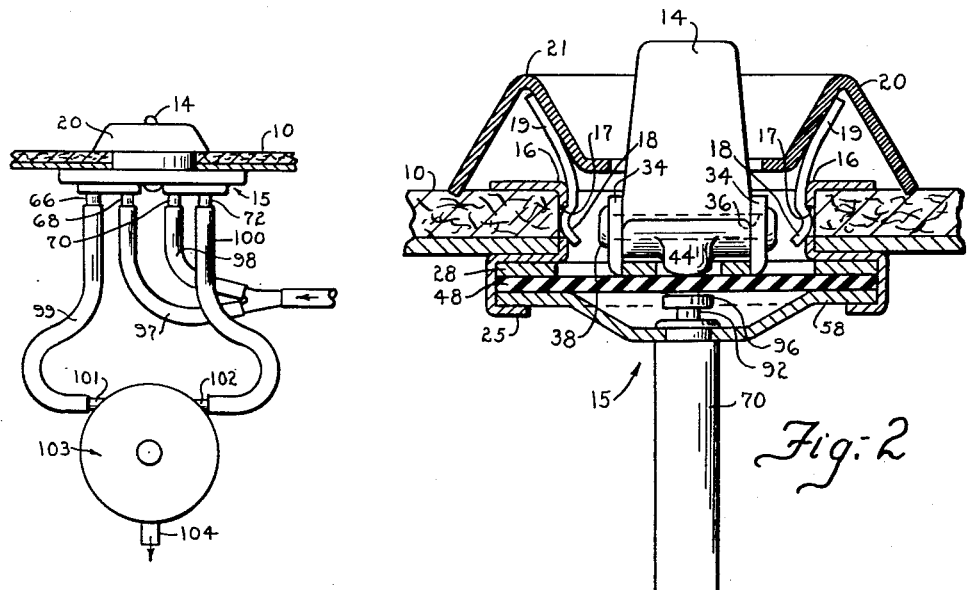
Fig.-3
Fig.-2
INVENTOR.
RALPH H. WISE
BY *Redrow & Recktenwald*
ATTORNEYS United States Patent Office 3,006,375
Patented Oct. 31, 1961

3,006,375
VALVE
Ralph H. Wise, Tampa, Fla., assignor, by mesne assignments, to The Anderson Company, a corporation of Indiana
Filed Oct. 3, 1957, Ser. No. 687,935
8 Claims. (Cl. 137—627.5)

This invention relates to a valve mechanism and more paritcularly to an improved air valve for use in an air pressure or vacuum system.

Heretofore, many different types of valve mechanisms have been used in air pressure or vacuum systems for controlling the flow of air under pressure or vacuum between two operative points in the system. However, most of these valve mechanisms maintain air under pressure or vacuum in the valve during that period of time when the valve is inoperative. To maintain the valve under pressure or vacuum requires a rather complex and expensive assembly directed toward preventing leaks in the valve. The parts must be machined and the connections provided with expensive seals which results in a bulky and costly device that must be constantly serviced and overhauled to keep it in an operative condition for use.

It is, therefore, a principal object of this invention to provide an improved valve mechanism adapted to overcome the above-noted disadvantages and that is capable of operating under all conditions of use.

It is another important object of this invention to provide an improved valve mechanism which is adapted to be maintained in a non-pressurized condition during periods of non-use.

It is still a further object of this invention to provide an improved valve mechanism that is inexpensively constructed and still highly efficient in use.

It is a still further object of this invention to provide a valve mechanism that can be easily replaced at low cost without the use of complicated equipment and seals.

And a still further object of this invention is to provide an improved valve mechanism that is adapted to permit flow of air under pressure or vacuum in either of two directions so as to operate a mechanism in either of two directions.

It is still a further object of this invention to provide an improved valve mechanism which contains relatively simple stamped parts that can be easily assembled by the use of relatively unskilled labor so as to produce a highly efficient and inexpensive device.

These and other objects and advantages of the invention will become apparent as the description of the same proceeds. The invention will be best understood from a consideration of the following detailed description taken in connection with the accompanying drawing forming part of the specification with the understanding, however, that the invention is not confined to any strict conformity with the showing of the drawing and may be changed or modified so long as such changes or modification mark no material departure from the salient features of the invention as expressed in the appended claims.

In the drawing:

FIGURE 1 is a side elevational view partially in section showing the principal parts of my invention;

FIGURE 2 is a cross-sectional view taken along the line 2—2 of FIGURE 1; and

FIGURE 3 is a simplified diagrammatical view of my invention showing an application thereof in combination with an air operated motor.

The invention as illustrated is adapted for use in any air pressure or vacuum-operated system whether for use with an air or vacuum motor, an air or vacuum pump or other pressure or vacuum-operated devices. Referring particularly to FIGURE 1 of the drawing, there is shown a valve adapted primarily for air under pressure and comprising a frame member or panel 10 having an aperture 12 in which is mounted the actuator portion 14 of the air valve 15 forming the basis of my invention. The valve 15 is positioned on the inner side of the frame 10 in registry with the aperture 12 and is fastened to the walls of the aperture by the spring clips 16, as shown in FIGURE 2. Each clip 16 has an aperture 17 therein in which is seated an upset portion 18 on the depending end of the catch members 19 attached to the inner surface of the escutcheon 20. The escutcheon 20 is adapted to be held in position over the aperture 12 with the handle or actuator 14 of the valve extending through an aperture in its central portion. A continuous ridge 21 is formed from the escutcheon 20 around the handle 14 so as to substantially protect said handle against accidental movement in either direction.

The valve 15 is comprised of inexpensive sheet metal parts and sheet metal stampings wherein a stamped cover member or plate 22 is formed with an aperture 23 centrally disposed therein and has a downwardly extending flange 24 completely around the periphery thereof. An inturned lip 25 is formed on the lower edge portion of the flange 24 and projects radially inwardly throughout substantially the full periphery of the cover 22 for clamping together the elements 28, 48, and 50, as will be explained subsequently. Beneath the cover plate 22 and within the confines of the flange 24 is a mounting plate or disc 28 having two spaced apertures 30 and 32 formed through the central portion thereof and from which is struck upwardly a pair of substantially parallel mounting lugs 34 having aligned openings 36 for receiving a pivot pin 38.

The pivot pin 38 passes through an aperture in the lower portion of the handle 14 for pivotally mounting the handle relative to the operative parts of the valve 15. A pair of oppositely extending arm members 40, 42 are carried by the lower end portion of the handle 14 and have contacting pads 43, 44 downwardly extending from the outer ends of the arms 40, 42, respectively, into aligned relationship with apertures 30, 32 formed in the mounting plate 28. A diaphragm 48, formed of neoprene material or the like, is positioned completely across the inner area of the cover member 22 within the confines of the flange 24 and engages in face-to-face relationship with the undersurface of the mounting disc 28. Positioned between the lip 25 on the flange 24 and the underportion of the diaphragm 48 and in sealing engagement therewith is a stamped bottom plate 50 which has two downwardly-shaped portions 52 and 54 spaced from each other by an intermediate portion 56. The bottom plate 50 is accordingly provided with a continuous portion 58 around the outer edge thereof and the intermediate portion 56 which is joined to said continuous edge portion 58 in such a way as to provide a pair of spaced chambers or compartments 60, 61. A rivet 62 is passed through the intermediate section 56 and through the diaphragm 48 and disc 28 to seal the bottom plate 50 to the disc 28, whereby the chambers or compartments 60 and 61 are substantially sealed from each other and from the outside of the valve 15.

Four tubes or nipples 66, 68, 70 and 72 are swedged or otherwise attached to apertures 74, 76, 78 and 80, respectively, formed in the bottom plate 50 such that the nipples 66 and 68 communicate with the sealed chamber 60 and the nipples 70 and 72 communicate with the chamber 61. Threaded into the inner portion of the nipples 68 and 70 are two one-way spring-operated valves 82 and 84, of the type generally known as Schrader valves which are well-known in the art and which have actuating elements 86 and 88, respectively, extending into the open portion of the bore of the tubes or nipples 68 and 70. In the form of invention shown in FIGURE 1, the Schrader valves are positioned to prevent air under pressure in the nipples from flowing to the chambers 60, 61. The valves 82, 84 each have a seat in the threaded portion which is seated by the pressure of the spring as well as by the pressure of the air in the nipples. The rods or stems 90, 92 engage with the elements 86, 88, respectively, and have a pair of heads 94, 96 disposed in spaced relation to the undersurface of the diaphragm 48 in substantially aligned relationship with the ends 43 and 44 of the actuator or handle 14. Movement of the handle 14 of the valve 15 about the pivot 38 in either a clockwise or counterclockwise direction will depress the diaphragm 48 downwardly against the actuator head 94 or 96 to move the stem 90 or 92 and valve actuating element 86 or 88, respectively, whereupon the valve 82 or 84 will be opened to permit air under pressure to flow through tube or nipple 68 or 70 into the appropriate respective chamber 60 or 61.

When the nipples 68, 70 are connected to a source of vacuum the valves 82, 84 will be of the reverse type so that the vacuum will not tend to open the valve, as will be obvious.

In FIGURE 3, the valve 15 is shown in one operative system wherein air under pressure or vacuum is supplied from a source, not shown, through the flexible tubes 97 and 98 to the tubes or nipples 68 or 70. A second pair of flexible tubes 99 and 100 are connected, respectively, with the tubes or nipples 66 and 72 and are connected at their other end portions with the inlets 101 and 102 of, for instance, an air pressure or vacuum motor 103 for driving the motor in either a clockwise or counterclockwise direction before said air or vacuum is exhausted through the outlet 104.

With the device of FIGURE 3 connected in the panel of a door of an automotive vehicle such that the air motor 103 is operative to raise or lower a window in said door, it is readily apparent that the air from the source, not shown, will be maintained under pressure in the flexible tubing 97 and 98 against the valves 82 and 84. The chambers 60 and 61 at this point are maintained devoid of pressure such that leaks or bleeding of the air pressure in said chambers is avoided. Upon pivoting the handle 14, for instance, in a clockwise direction, the pad 44 depresses the rod 92 for opening the valve 84 to admit air under pressure to the chamber 61 whereupon the air is permitted to flow through the nipple 72 and flexible tubing 100 to the motor 103 and through exhaust outlet 104 for driving said motor in a particular direction for raising or lowering the window in the automotive vehicle. Upon release of the handle 14 the source of air pressure is cut off from the chamber 61 and the air motor 103 by the valve 84 and the static condition is restored. Operation of the handle 14 in a counterclockwise direction will affect admission of air to the chamber 60 for driving the motor 103 in a direction opposite to that described hereinbefore. The air under pressure or vacuum could be passed through the valve to a mechanism wherein the air is used to excite a piston in either direction for creating different types of useful work.

In operating a system employing a valve 15 as described, it is readily apparent that in the event the valve fails to operate or deteriorates with age, it may be easily replaced by simply snapping the escutcheon 20 from around the handle 14 and pushing the valve inwardly from the frame 10. The tubing 97, 98, 99 and 100 may be readily slipped from the nipples 66, 68, 70 and 72 whereupon the old valve 15 may be discarded. A new valve may be easily installed by reversing the just-described steps of attaching the tubing, pushing the valve through the opening 12 in the frame 10 and snapping the escutcheon 20 in place. Only a few minutes time is consumed in the replacement of the valve so that the system is once again in efficient operating condition. Since the valves 15 are made from relatively simple stampings, the unit is comparatively inexpensive and, therefore, not worth repairing or overhauling, it being simpler to completely replace the unit. The stamping of the parts of the valve and their assembly can be easily accomplished so that an efficient device is produced. The chambers 60 and 61 of the valve are unpressurized when the valve is inoperative such that expensive seals and connections are not necessary.

From the foregoing, it is obvious that I have attained the aforementioned objects of my invention and have provided an improved air valve mechanism wherein inexpensive stampings are used to form the operative parts of my valve so as to produce an efficient and yet inexpensive valve mechanism.

The improved valve does not maintain the chambers under pressure so that the possibility of leaks from the system during periods of non-use is substantially eliminated. The valve mechanism is easily and cheaply installed and requires no maintenance or upkeep during its operative life.

Having thus described my invention, it is obvious that various other modifications may be made in the same without departing from the spirit of my invention, hence I do not wish to be understood as limiting myself to the exact forms, constructions, arrangements and combinations of parts herein shown and described or uses mentioned.

I claim:
1. Valve mechanism for directing fluid flow to either of the input conduits of a reversible motor, comprising a sheet metal plate having spaced recess portions stamped therein, a diaphragm of elastomeric material overlying said plate in face-to-face contact therewith save for said recess portions, a sheet metal mounting plate overlying said diaphragm in face-to-face contact therewith, a sheet metal cover plate overlying said mounting plate in face-to-face contact and having an opening in the central portion thereof, the peripheral portion of said cover plate being flanged downwardly around the edges of said mounting plate and inwardly under the first recited plate and clamping all said plates and diaphragm together, clamp means passing through the first-recited plate between the recess portions, the diaphragm and the mounting plate, whereby the two recessed portions in conjunction with said diaphragm define two chambers, an inlet and an outlet communicating with each chamber, a spring-actuated one-way valve in each inlet and means extending from each valve to adjacency with the diaphragm, the central portion of the mounting plate having struck upwardly therefrom two opposed lugs establishing a pivot and also having formed therein two openings overlying the means extending from said valves, a rocker arm pivoted intermediate its ends on said lugs, a lever projecting from the mid-portion of said arm and the ends of said arm having tabs projectable through said openings on the rocking of said arm for selectively actuating said valves, the cover plate having at least two upstanding spring clips engageable with the wall of an opening in a panel, said clips being formed with pockets therein, an escutcheon having a slot therein for said lever and adapted to be disposed on the opposite face of said panel, said escutcheon having spring arms engageable with the pockets in said clips for detachably mounting said cover plate.

2. A valve mehcanism for directly fluid flow to either of the input conduits of a reversible motor, comprising a sheet metal plate having spaced recess portions stamped therein, a diaphragm of elastomeric material overlying said plate in face-to-face contact therewith save for said recess portions, a mounting plate overlying said diaphragm in face-to-face contact therewith, means clamping said plates and diaphragm together whereby said two recess portions in conjunction with said diaphragm define two chambers, an inlet and an outlet communicating with each chamber, a depressible valve unit arranged in each inlet with a control element therefor disposed contiguous the diaphragm, said mounting plate having two upstanding lugs struck therefrom and also an opening overlying each valve control element, a rocker arm pivoted intermediate its ends on said lugs, the mid-portion of said arm carrying an actuator device and each end of said arm having a projection extending through one of said openings for selectively actuating said valve units.

3. Valve mechanism of the kind described comprising a sheet metal plate having spaced recess portions formed therein, a diaphragm overlying said plate, a mounting plate overlying said diaphragm, means clamping said plates and diaphragm together, an inlet nipple and an outlet nipple communicating with each recess portion of said first-named plate, a depressible one-way valve unit in and controlling each inlet nipple and having an element extending contiguous the diaphragm, said mounting plate being provided with an aperture overlying each of said valve units and having means struck therefrom for mounting an actuator device, and a manually operable self-returning actuator rockably mounted on said means about a fixed axis generally parallel to said mounting plate and having portions projecting toward said apertures for selective operation of said valve units.

4. Valve mechanism for the purpose described comprising a body having spaced cavity portions formed therein, a diaphragm overlying said body in face-to-face contact therewith save for said portions, a flat member overlying said diaphragm in fact-to-face contact therewith, means clamping said body, diaphragm, and member together, an inlet nipple and an outlet nipple communicating with each of said cavity portions and projecting therefrom to receive thereon the ends of rubber hoses, a one-way valve unit mounted in and controlling flow through each inlet nipple, an energizing element of each of said units terminating contiguous the diaphragm, said flat member having apertures formed therein overlying said energizing elements, and a manually operable self-returning actuator device rockably mounted on said flat member about a fixed axis generally parallel thereto and including elements selectively projectable through said apertures for operating one or the other inlet valve unit.

5. Valve mehcanism of kind described, comprising a body having a flat surface save for two spaced recess portions formed therein, a diaphragm overlying said surface, a plate overlying said diaphragm, means clamping said body, diaphragm, and plate together, an inlet and an outlet nipple communicating with the bottom of each of said recess portions and projecting therefrom generally normally to the diaphragm for receiving the ends of rubber hose thereon, a one-way depressible valve unit in each inlet nipple having an element extending adjacent the diaphragm, the plate having apertures formed therein respectively overlying said elements, and a manually operable self-returning actuator rockably mounted on said plate about a fixed axis generally parallel thereto and having portions projectable through said apertures for selectively operating said inlet valve units.

6. Valve means of the kind described comprising a sheet metal plate having at least two spaced recess portions stamped therein, a diaphragm overlying said plate, a second plate overlying said diaphragm, a sheet metal cover plate having an opening in the central portion thereof, said cover plate overlying said second plate, the peripheral portion of said cover plate being flanged down around the edges of said first-mentioned plates and diaphragm and inwardly under the first-mentioned plate and clamping all the afore-mentioned parts together, an inlet and an outlet nipple extending from each recess portion generally normally to the diaphragm, a spring-closed depressible one-way valve unit in each inlet nipple, each valve unit having an operating element terminating adjacent said diaphragm, said second plate having openings therethrough respectively overlying said elements, and manually operable self-returning actuating means rockably mounted on said second plate about a fixed axis generally parallel thereto and including means projectable through said apertures.

7. Valve means of the kind described comprising a plate having at least two spaced recess portions formed therein, a diaphragm overlying said plate, a flat member overlying said diaphragm, a member of sheet metal girdling the periphery of said plate, diaphragm, and flat member and having its edge portions flanged upon the flat member and under the plate, respectively, to clamp the structure together, inlet and outlet means projecting from each recess portion generally normally to the diaphragm, a spring-biased depressible one-way valve unit in each inlet means, each valve unit having an operating element terminating adjacent the diaphragm, said flat member having openings therethrough respectively overlying said elements, and manually operable self-returning actuating means rockably mounted on said flat member about a fixed axis generally parallel thereto and including means projectable through said apertures against said diaphragm.

8. Valve means comprising a sheet metal body having spaced recess portions stamped therein, a diaphragm of elastomeric material overlying said body, means clamping the diaphragm to said body and about said recess portions, inlet and outlet means projecting from each recess generally normal to said diaphragm, a spring-closed one-way valve unit in each inlet means and an operating element extending from each valve unit and terminating contiguous said diaphragm, a rocker device mounted above said diaphragm and having presser feet engageable with said diaphragm at points respectively overlying said elements, said clamping means having a plurality of clips projecting therefrom for engagement with an opening in a panel, and an escutcheon having catches engageable with said clips.

References Cited in the file of this patent

UNITED STATES PATENTS

| | | |
|---|---|---|
| 388,969 | Haden | Sept. 4, 1888 |
| 929,367 | Andersson | July 27, 1909 |
| 1,065,615 | Lawler | June 24, 1931 |
| 2,243,937 | Almond | June 3, 1941 |
| 2,409,765 | Kehle | Oct. 22, 1946 |
| 2,607,600 | Trautman | Aug. 19, 1952 |
| 2,876,794 | Reedy | Mar. 10, 1959 |

UNITED STATES PATENT OFFICE
CERTIFICATE OF CORRECTION

Patent No. 3,006,375             October 31, 1961

Ralph H. Wise

It is hereby certified that error appears in the above numbered patent requiring correction and that the said Letters Patent should read as corrected below.

Column 1, line 59, for "modification" read -- modifications --; column 4, line 47, after "diaphragm" insert a comma; line 69, for "mehcanism" read -- mechanism --; same line 69, for "directly" read -- directing --; column 5, line 33, for "fact-to-face" read -- face-to-face --; line 47, for "mehcanism" read -- mechanism --; same line 47, for "of kind" read -- of the kind --; column 6, line 43, for "normal" read -- normally --; line 58, for "June 24, 1931" read -- June 24, 1913 --.

Signed and sealed this 19th day of June 1962.

(SEAL)
Attest:

ERNEST W. SWIDER             DAVID L. LADD
Attesting Officer              Commissioner of Patents